United States Patent Office 3,344,259
Patented Sept. 26, 1967

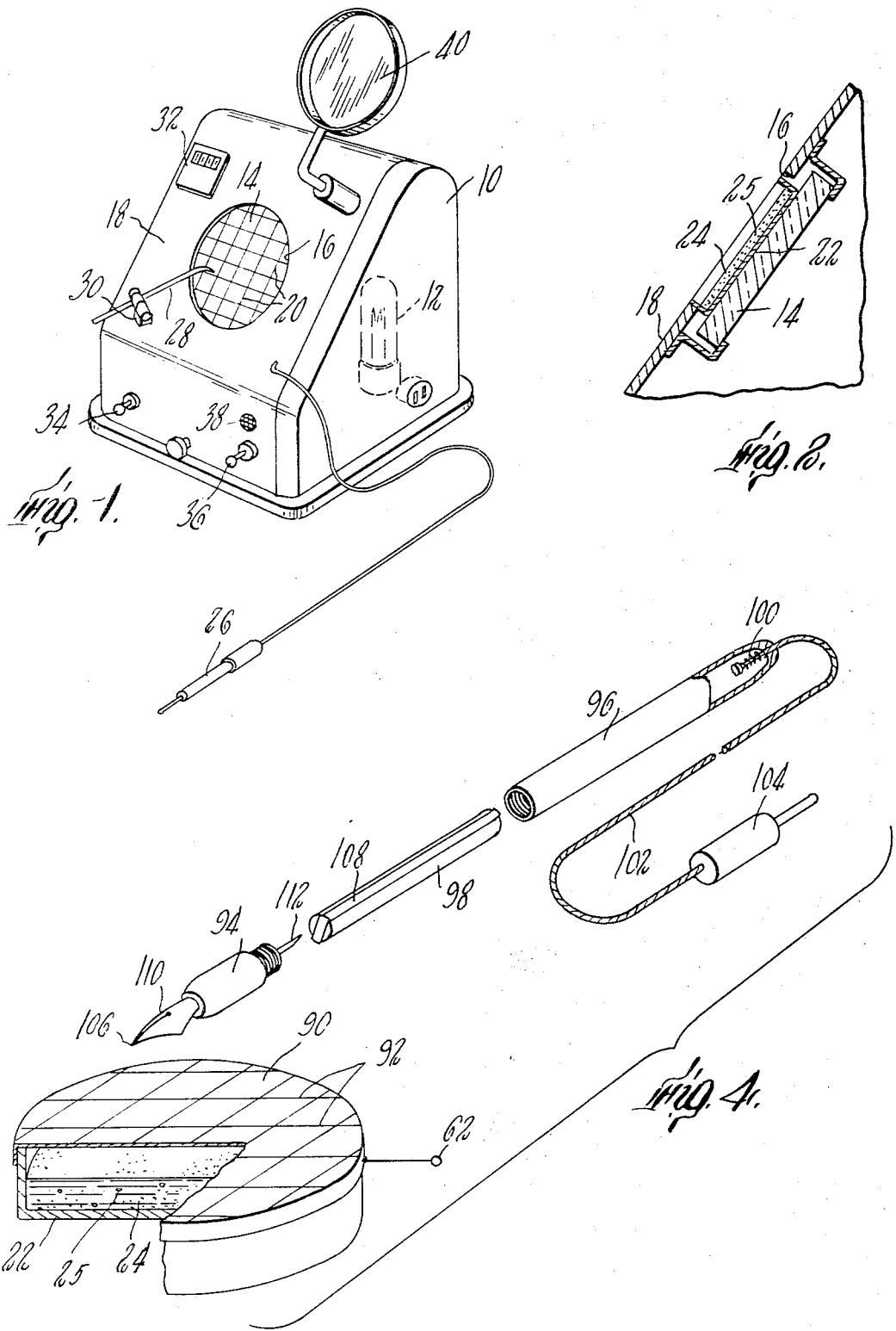

3,344,259
COLONY COUNTER
John Degelman, Littleton, Mass., assignor to Bio-Dynamics, Incorporated, Cambridge, Mass., a corporation of Massachusetts
Filed Jan. 30, 1964, Ser. No. 341,299
7 Claims. (Cl. 235—92)

ABSTRACT OF THE DISCLOSURE

A bacteria colony counter includes an inclined acrylic plastic plate that provides a support for an agar medium in which the bacteria colonies are disposed. A light source behind the plastic plate illuminates the agar medium through dark field edge lighting. A transparent film of water miscible regenerated cellulose having a grid printed on it is disposed above the agar medium. A hand held marking and counting probe is connected to a monostable multivibrator in circuit with the transparent film. The multivibrator is triggered when the hand held probe contacts the film in a marking operation and the output of the multivibrator steps a counter. The multivibrator isolates the probe from the counter for a period of 50 milliseconds after the probe—film circuit is interrupted.

---

This invention relates to counting devices and more particularly to devices for counting colonies of bacteria in a growth medium.

Typically, colonies of bacteria are grown in an agar medium disposed in a transparent (Petri) dish. The dish is mounted, for counting purposes, in a reading apparatus having a light source arranged therein so the light is directed through the agar medium in a manner to render more visible the bacterial colonies in that medium. Often the count of the number of colonies in the medium is made by an operator who merely mentally retains a running total. Such a process is obviously subject to error, particularly where the number of colonies is large, and probe type counting mechanisms have been devised to assist in making accurate counts. In one known type (Kavanagh Patent No. 2,548,478) a fountain pen is tilted to operate an electrical contact when sufficient pressure is applied to the pen, and in another type (Glaser Patent No. 3,083,909) a radio frequency device is operated when a probe is placed near a colony and produces a counter stepping signal. Each system has limitations, the former being difficult to actuate without distorting the medium unless a rigid protective member is interposed and relatively easily accidentally operated, as against a table, for example, and the latter being expensive and also requiring precision adjustment and maintenance. In operation of such systems, the technicians making the bacteria colony counts often have trouble in actuating such counters according to the actual count—the probes either being too responsive (and hence producing extraneous counts) or insufficiently sensitive (and failing to record counts).

Accordingly, it is an object of the invention to provide a novel and improved bacteria colony counting apparatus.

Another object of the invention is to provide novel and improved probe circuitry for use in colony counting apparatus.

Still another object of the invention is to provide a novel and improved colony counter in which greater variation in probe manipulation techniques is permitted.

In addition to mechanical counting problems, it is often difficult to distinguish the bacteria colonies, and a further object of the invention is to provide novel and improved lighting arrangements for bacteria colony counting apparatus.

Other objects, features and advantages of the invention will be seen as the following description of a preferred embodiment thereof progresses, in conjunction with the drawing, in which:

FIG. 1 is a perspective view of colony counting apparatus constructed in accordance with the invention;

FIG. 2 is a sectional view through the aperture in the face of the apparatus shown in FIG. 1, showing a Petri dish supported therein;

FIG. 4 is a sectional view of a Petri dish and cover useful in the invention, together with a diagrammatic view of one form of a movable marker and probe.

Figure 3:
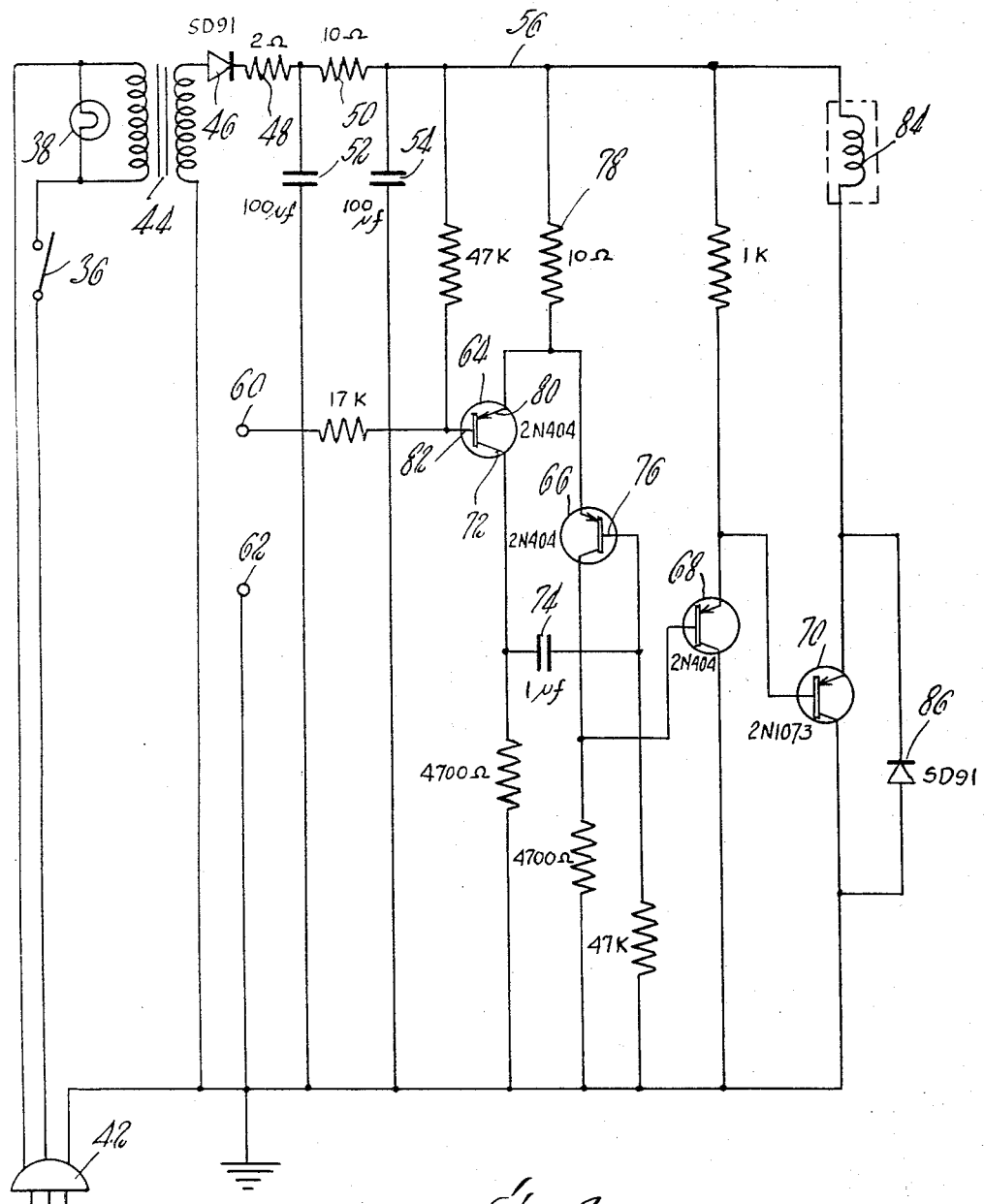
FIG. 3 is a schematic diagram of the electrical circuitry employed in the structure shown in FIG. 1.

The colony counter shown in FIG. 1 includes a housing 10 in which a light source 12 is mounted. A transparent plate 14 is positioned slightly behind and across circular aperture 16 in inclined face 18 of the housing, and through the use of reflecting elements (not shown) radiation from source 12 produces edge lighting of both the aperture 16 and the support plate 14. Other sources, such as a fluorescent tube of circular or annular configuration positioned concentrically with respect to aperture 16, may also be employed. The plate 14 may be manufactured of a transparent acrylic plastic material, such as that sold under the trademark Lucite or Plexiglas, on which are scribed thin lines 20 in grid, Wolffhuegal or other suitable patterns. A Petri dish 22 is positioned on plate 14 within aperture 16 for viewing purposes. When the Petri dish 22 is so supported therein, as shown in FIG. 2, the transmissivity characteristics of the material 24 within the Petri dish are enhanced through the darkfield edge lighting. Also, the thin scribed lines 20 on plate 14, rather than being opaque, are themselves virtual light sources and enhance the viewability of the contents of the Petri dish.

The agar medium 24, in which the colonies 25 of bacteria to be counted are disposed, is slightly electrically conductive. That medium is employed to complete an electrical circuit between handheld probe 26 (which may be a single insulated conductor) and fixed probe 28 that is in electrical contact with the agar medium 24. Probe 28 may be secured by magnet 30 on the housing or may be otherwise fixed to the housing in position so that it may make electrical contact with the medium. Electrical circuitry from these probes is connected to operate counter 32.

On the face of the housing there are conventional controls including switches 34, 36 and an indicator light 38. In addition, there is mounted on the housing a magnifying glass 40 which may be positioned over the aperture 16 to magnify and facilitate the observation of colonies in the specimen positioned in the apparatus.

With reference to FIG. 3, the electrical circuit is supplied from a conventional power source through plug 42 to a transformer 44 which steps down the input voltage to a suitable voltage for operating transistors (a typical voltage being in the order of twelve volts). Switch 36 controls the application of power to the transistor circuitry and lamp 38 is energized when switch 36 is closed. A rectifier circuit, including diode 46, resistors 48, 50, and capacitors 52, 54, provides power to bus 56.

The handheld counting probe 26 is connected at terminal 60, and the fixed or ground probe 28 is connected at terminal 62. The sensing circuit includes four transistors 64, 66, 68, and 70. Transistors 64 and 66 are connected in a monostable multivibrator configuration, collector 72 of transistor 64 being connected through capacitor 74 to base 76 of transistor 66, and the emitters of the two transistors 64, 66 being connected together.

Normally, transistor 66 is in conducting condition and the resulting voltage drop through resistor 78 biases the emitter 80 of transistor 64 sufficiently negative with respect to its base 82 to maintain transistor 64 in cut-off (non-conducting) condition. When a circuit is completed between terminals 60 and 62, as by touching probe 26 to the agar medium 24 (providing a resistance that may be as high as 2.5 megohms for example), the potential on base 82 is reduced sufficiently for transistor 64 to conduct, and the resulting output transition from collector 72 is coupled through capacitor 74 and turns off transistor 66.

The resulting signal transition when transistor 66 is cutoff is directly applied from the collector of transistor 66 to transistor 68 which is connected in emitter follower configuration and provides current gain. Its output signal is applied to output transistor 70 which provides a signal to energize coil 84 of the counter 32 in a stepping (and counting) operation. (Diode 86 is connected across transistor 70 as a protective device in conventional manner.)

Transistor 66 is maintained in cut-off condition until the charge on capacitor 74 dissipates to a predetermined level, at which level transistor 66 returns to its initial conducting condition and the multivibrator circuitry then has returned to its original (stable) state. However, it will be apparent that capacitor 74 will not start to discharge until the bridging resistance across terminals 60 and 62 is removed, as transistor 64 continues to conduct until its base potential is allowed to rise. The bridging resistance (the agar medium 24) must be absent for a period of about fifty milliseconds before the circuitry will return to its stable state, and should the probe 26 break contact and be returned within that period, the multivibrator wouldn't reset, but rather the charge on capacitor 74 would be replenished. Thus, the circuitry provides a sensitive probe circuit having a time isolating characteristic so that multiple counts from a single intended colony count, such as are produced by repeated contacts with the agar 24 (e.g. due to hand vibrations) in other systems, are avoided. Also, the circuit is insensitive to a second count until capacitor 74 has discharged, so that maintaining probe 26 in contact with the agar will not result in a series of counts. Thus, the circuitry facilitates the movement of probe 26 and increases the accuracy of the resulting count.

Suitable component values have been indicated on the drawing for the components employed in this circuitry, and it is believed from the above description that its operation will be evident.

In a modified arrangement a transparent film 90 of electrical conductive material, such as water miscible regenerated cellulose (dialysis tubing manufactured by Visking Corporation for example), is positioned across the top of the Petri dish 22, as shown in FIG. 4. The ground probe 28 is connected to this film 90 rather than to the medium in the Petri dish. This avoids contamination of the agar 24 and the colonies 25, as the film need not be removed for counting purposes. The transparent film may carry a conventional grid 92, such as a Wolffhuegal pattern, to provide a reference for various colonies. The movable probe may be in the form of a ballpoint pen with modified ink suitable for marking the film or of the type indicated in the exploded view in FIG. 4. That marking pen includes components 94, 96 of a commercial fountain pen, modified commercial ink cartridge 98, contact spring 100, conductor 102, and plug 104 which is connected to the counting circuitry at terminal 60. To assure electrical contact from the tip 106 of the pen to the counting circuitry, the end of the conductor 102 opposite plug 104 is passed through a hole in the barrel 96 of the pen, and attached to compression spring 100. A standard ink cartridge 98, on which a strip of aluminum foil 108 has been glued so that the foil covers both ends and makes connection between them, is inserted into the barrel 96. The section 94 of the pen containing the nibs 110 and a metal puncturing device 112 is screwed into the barrel 92. This results in device 112 puncturing the foil covered cartridge 98, allowing ink to flow to the nib 110. Since the ink is a conductor, a complete electrical path is established between the counting instrument and the tip of the pen.

Thus, touching the point 106 of the pen probe to the film 90 (or directly to the agar 24 where a film is not used) completes a conductive path sufficient to actuate the counting circuitry and at the same time a record of the counted colony is placed on the film. This marked film 90 then affords a permanent record of the location and number of the colonies in a particular sample. This probe device has the advantage of not actuating the counter when the ink is depleted.

While a preferred embodiment of the invention has been shown and described, various modifications therein will be apparent to those skilled in the art. Therefore, it is not intended that the invention be limited to the disclosed embodiment or to details thereof, and departures may be made therefrom within the spirit and scope of the invention as defined in the claims.

What is claimed is:

1. Counting apparatus for counting bacterial colonies disposed in a dish, comprising,
   transparent dish support means,
   a grid scribed on said support means,
   means to edge light said support means,
   an electrical resistance medium extending over the entire area of said dish,
   a first electrical terminal connected to said medium,
   a second electrical terminal,
   an electrically conductive manipulable probe element connected to said second terminal,
   a counter for registering the number of colonies counted, and
   circuit means connected between said first and second terminals and said counter, said circuit means including means for applying a stepping signal to said counter in response to the contact of said probe with said electrical resistance medium, and means for preventing application of a stepping signal to said counter until an open circuit between said medium and said probe element has existed for a predetermined period of time.

2. Counting apparatus for counting bacterial colonies disposed in a dish, comprising,
   transparent dish support means,
   a grid scribed on said support means,
   means to edge light said support means,
   an electrical resistance medium extending over the entire area of said dish,
   a first electrical terminal connected to said medium,
   a second electrical terminal,
   an electrically conductive manipulable probe element connected to said second terminal,
   a counter for registering the number of colonies counted, and
   circuit means connected between said first and second terminals and said counter for applying a stepping signal to said counter in response to the contact of said probe with said electrical resistance medium.

3. Counting apparatus for counting bacterial colonies disposed in a dish, comprising,
   transparent dish support means,
   a grid scribed on said support means,
   means to edge light said support means,
   a transparent film of electrical conductive material disposed over said dish,
   a first electrical terminal connected to said film,
   a second electrical terminal including an electrically conductive manipulable probe element,
   a counter for registering the number of colonies counted, and
   circuit means connected between said first and second terminals and said counter for applying a stepping signal to said counter in response to the contact of said probe with said film.

4. The apparatus as claimed in claim 3 wherein said film is composed of water miscible regenerated cellulose.

5. The counting apparatus as claimed in claim 16 wherein said support means comprises an acrylic plastic.

6. The apparatus as claimed in claim 5 wherein said circuit means includes monostable multivibrator circuitry.

7. The apparatus as claimed in claim 6 wherein said monostable multivibrator circuitry includes two transistors each having emitter, base and collector electrodes,
   means connecting said emitter electrodes together,
   means capacitively coupling the collector electrode of one of said transistors to the base electrode of the other transistor,
   means connecting the base electrode of said one transistor to one of said terminals, and
   means connecting the collector electrode of said other transistor to said counter.

References Cited
UNITED STATES PATENTS

| | | | |
|---|---|---|---|
| 2,548,478 | 4/1951 | Kavanagh | 235—64 |
| 3,083,909 | 4/1963 | Glaser | 235—92 |
| 3,274,421 | 9/1966 | Johnson | 313—109.5 |

DARYL W. COOK, *Acting Primary Examiner.*

G. MAIER, *Assistant Examiner.*